United States Patent
Morris et al.

(10) Patent No.: US 9,425,592 B2
(45) Date of Patent: Aug. 23, 2016

(54) ELASTICALLY DEFORMABLE CONDUIT ASSEMBLY AND METHOD OF FITTINGLY RETAINING WIRES

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 182 days.

(21) Appl. No.: 13/796,758

(22) Filed: Mar. 12, 2013

(65) Prior Publication Data

US 2014/0264206 A1    Sep. 18, 2014

(51) Int. Cl.
| | |
|---|---|
| H02G 1/08 | (2006.01) |
| F16L 11/00 | (2006.01) |
| B60R 16/02 | (2006.01) |
| H02G 3/04 | (2006.01) |
| H02G 3/32 | (2006.01) |

(52) U.S. Cl.
CPC .............. *H02G 1/08* (2013.01); *B60R 16/0215* (2013.01); *F16L 11/00* (2013.01); *H02G 3/0468* (2013.01); *H02G 3/0481* (2013.01); *H02G 3/32* (2013.01)

(58) Field of Classification Search
None
See application file for complete search history.

(56) References Cited

U.S. PATENT DOCUMENTS

| | | | | |
|---|---|---|---|---|
| 4,879,810 A | * | 11/1989 | Sergeant | H01R 43/28 29/861 |
| 4,990,143 A | * | 2/1991 | Sheridan | A61M 16/04 604/526 |
| 5,172,878 A | * | 12/1992 | Lederman | F16C 1/106 24/453 |
| 5,187,852 A | * | 2/1993 | Stanley et al. | 29/243.57 |
| 5,199,891 A | * | 4/1993 | Reed | 439/98 |
| 5,938,587 A | * | 8/1999 | Taylor et al. | 600/139 |
| 6,354,545 B1 | * | 3/2002 | Liao | B60T 7/104 224/459 |
| 2009/0099574 A1 | * | 4/2009 | Fleming, III | 606/113 |
| 2009/0233052 A1 | * | 9/2009 | Thuot et al. | 428/159 |
| 2009/0306574 A1 | * | 12/2009 | Kopperschmidt | A61M 1/3653 604/6.16 |
| 2011/0125133 A1 | * | 5/2011 | Aggerholm | A61M 25/0097 604/523 |

FOREIGN PATENT DOCUMENTS

| | | |
|---|---|---|
| CN | 2487798 Y | 4/2002 |
| EP | 1587573 B1 | 6/2008 |

OTHER PUBLICATIONS

Office Action regarding related CN App. No. 201410089011.1; ated Dec. 23, 2015; 9 pgs.

* cited by examiner

*Primary Examiner* — Joseph J Hail
*Assistant Examiner* — Brian Keller
(74) *Attorney, Agent, or Firm* — Cantor Colburn LLP

(57) ABSTRACT

An elastically deformable conduit assembly includes a conduit comprising an outer surface and formed of an elastically deformable material, the conduit configured to deform from a relaxed condition to an elastically deformed condition. Also included is a mating component configured to engage the outer surface of the conduit in the elastically deformed condition.

4 Claims, 4 Drawing Sheets

ELASTICALLY DEFORMABLE CONDUIT ASSEMBLY AND METHOD OF FITTINGLY RETAINING WIRES

FIELD OF THE INVENTION

The present invention relates to an elastically deformable conduit assembly, as well as a method of fittingly retaining wires within the elastically deformable conduit assembly.

BACKGROUND

Currently, components which are to be mated together in a manufacturing process are subject to positional variation based on the mating arrangements between the components. One common arrangement relates to an assembly configured to retain a bundle of wires or cables and securing the assembly in a fixed location. The arrangement may include components mutually located with respect to each other by 2-way and/or 4-way male alignment features; typically undersized structures which are received into corresponding oversized female alignment features such as apertures in the form of openings and/or slots. There may be a clearance between at least a portion of the alignment features which is predetermined to match anticipated size and positional variation tolerances of the mating features as a result of manufacturing (or fabrication) variances. As a result, occurrence of significant positional variation between the mated components is possible, which may contribute to the presence of undesirably large and varying gaps and otherwise poor fit. The clearance between the aligning and attaching features may lead to relative motion between mated components, which contributes to poor perceived quality. Additional undesirable effects may include squeaking and rattling of the mated components, for example.

A wire retaining conduit that is mounted via a fastener or mated component is an example of mated components, as described above. Typically, the wires contained within the wire retaining conduit are loosely bundled within the conduit, such that they are prone to movement and "slapping" with each other and other surrounding components.

SUMMARY OF THE INVENTION

In one exemplary embodiment, an elastically deformable conduit assembly includes a conduit comprising an outer surface and formed of an elastically deformable material, the conduit is configured to deform from a relaxed condition to an elastically deformed condition. Also included is a mating component configured to engage the outer surface of the conduit in the elastically deformed condition.

In another exemplary embodiment, a method of fittingly retaining wires is provided. The method includes extending a plurality of wires through a conduit, wherein the conduit is formed of an elastically deformable material. The method also includes elastically deforming the conduit to an elastically deformed condition, the elastically deformed condition comprising a narrowing of at least a portion of the conduit. The method further includes engaging a mating component with the portion of the conduit that is narrowed in response to the elastic deformation of the conduit.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
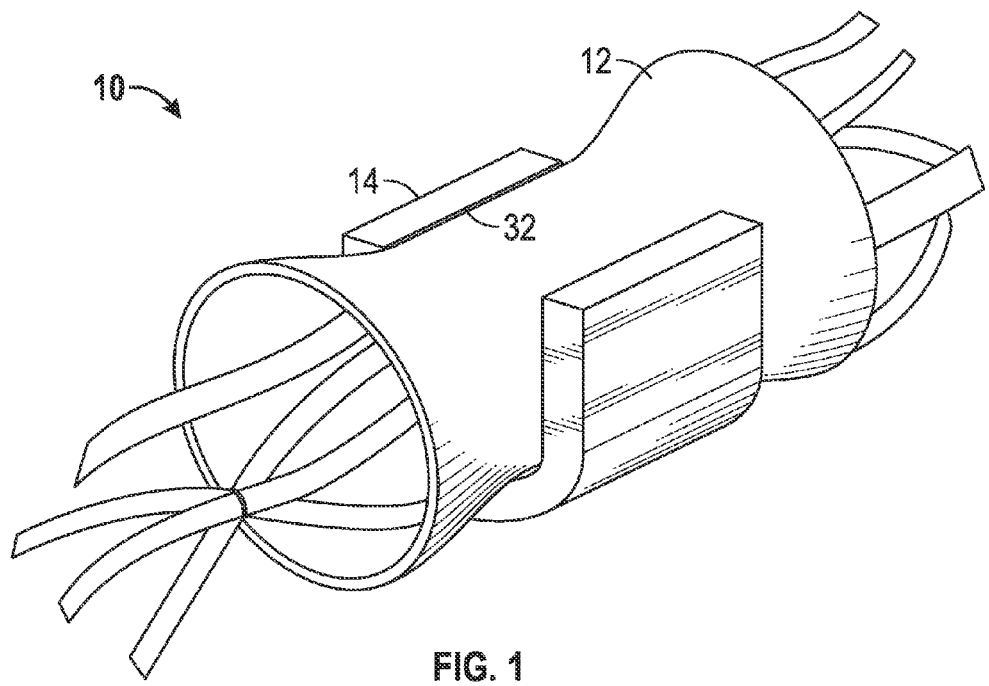
FIG. 1 is a perspective view of an elastically deformable conduit assembly.

Referring to FIG. 1, illustrated is an elastically deformable conduit assembly 10. The elastically deformable conduit assembly 10 comprises matable components, such as a conduit 12 and a mating component 14 that may be disposed in a mated configuration with respect to each other. In one embodiment, the elastically deformable conduit assembly 10 is employed in a vehicle application, however, it is to be understood that the components may be associated with numerous other applications and industries that require retaining and/or routing of bundled wire or cable arrangements, such as home appliance and aerospace applications, for example.

Figure 2:
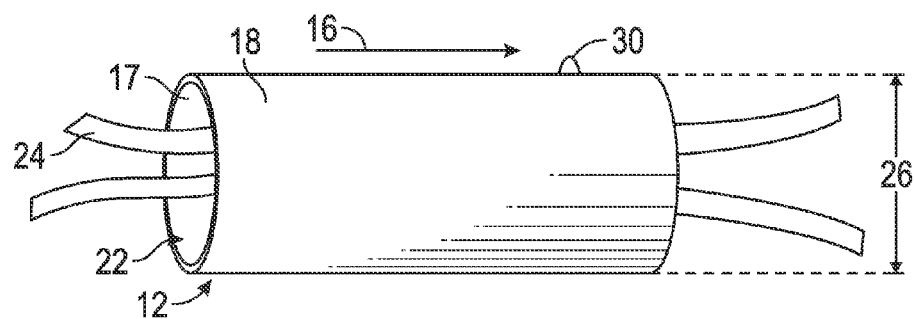
FIG. 2 is a side, elevational view of a conduit of the elastically deformable conduit assembly in a relaxed condition according to a first embodiment.
Figure 3:
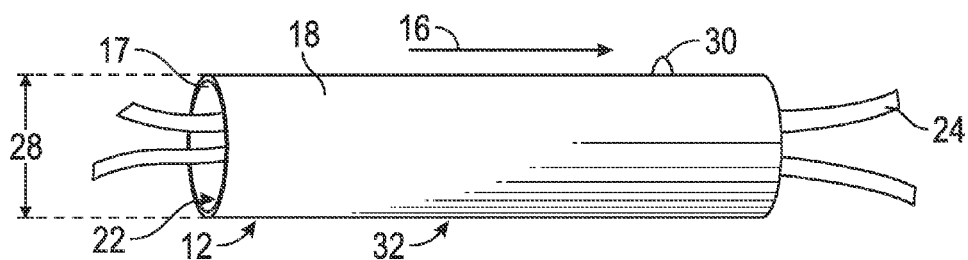
FIG. 3 is a side, elevational view of the conduit of FIG. 2 in an elastically deformed condition.

Referring to FIGS. 2 and 3, the conduit 12 is illustrated in distinct conditions which will be described in detail below. In the illustrated embodiment, the conduit 12 is formed in a substantially circular geometry, such as a tubular member that extends in a longitudinal direction 16. The conduit 12 includes an outer surface 18 that forms a perimeter and a conduit diameter in the case of a circular conduit. The conduit also includes an inner surface 17 that defines a conduit path 22 for at least one, but typically a plurality of wires 24 to extend through. It is to be appreciated that the plurality of wires 24 generally refers to numerous types of wires, cables, or the like.

Figure 4:
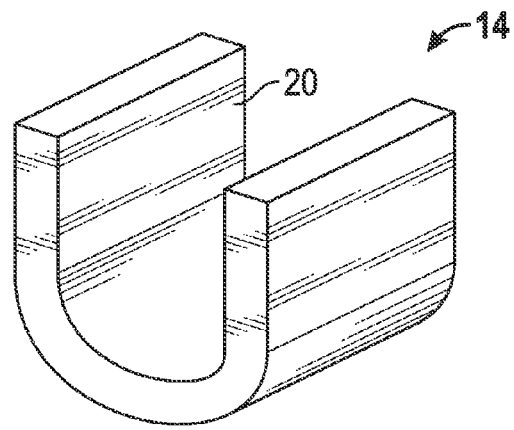
FIG. 4 is a perspective view of a mating component of the elastically deformable conduit assembly.

Referring to FIG. 4, with continuing reference to FIGS. 1-3, the mating component 14 is configured to engage in a tight, mated relationship with the conduit 12 to provide structural support for the conduit 12, and thereby the plurality of wires 24 disposed in the conduit path 22. Additionally, the loose disposition of the plurality of wires 24 is altered to a more fitted arrangement of the plurality of wires 24, as further described below. Such an arrangement of the plurality of wires 24 reduces or eliminates the tendency of the wires to move during operation of the application in which it is employed. In the example of a vehicle, the tight, mated relationship between the conduit 12 and the mating component 14, as well as the reduction or elimination of wire movement, rattling or the like is reduced during movement of the vehicle, thereby adding to the perceived quality of the vehicle by a user. The mating component 14 may be formed in numerous geometries, such as the illustrated embodiment of a substantially U-shaped geometry.

The fitted arrangement of the plurality of wires 24, as well as the tight mated arrangement of the conduit 12 and the mating component 14, is facilitated by the elastically deformable nature of the conduit 12, which accounts for positional variation of the components that is inherently present due to manufacturing processes. In a relaxed condition (FIG. 2), the outer surface 18 of the conduit 12 includes a first perimeter or first width 26. The elastically deformable nature of the conduit 12 facilitates manipulation of the conduit 12 to an elastically deformed condition (FIG. 3) that narrows at least a portion of the conduit 12 to a second perimeter or second width 28, with the second width being less than the first width 26. A user or machine may be assisted during the manipulation of the conduit 12 by a feature extending from the outer surface 18 of the conduit 12, such as a hook 30. The hook 30 may be engaged to exert a force on the conduit 12 in an effort to manipulate the conduit 12 to the elastically deformed condition, thereby narrowing a portion of the conduit 12. It is to be appreciated that a plurality of such features, like the hook 30, may be employed. In one embodiment, a hook is disposed proximate opposing longitudinal ends of the conduit 12.

In the illustrated first embodiment of FIGS. 2 and 3, the elastically deformed condition of the conduit 12 comprises a stretched condition. The stretched condition results from an elongation of the conduit 12 in the longitudinal direction 16 of the conduit 12. In this condition, the conduit 12 is stretched to cause the length of the conduit 12 to increase and at least a portion of the conduit 12 to decrease in perimeter or width. Upon attaining the stretched condition (i.e., elastically deformed condition), at least a portion of the outer surface 18 of the conduit 12 is small enough to fit within the inner surface 20 of the mating component 14, which is not the case prior to elastically deforming the conduit 12. As noted above, the elastically deformed condition is maintained by exerting force(s) on the conduit 12. These forces are maintained until the conduit 12 is disposed in engagement with the mating component 14. Subsequent release of the conduit 12 results in the conduit 12 tending back to the relaxed condition, however, the inner surface 20 of the mating component 14 is dimensioned to prevent the conduit 12 from fully attaining the relaxed condition by compressing an engagement portion 32 of the outer surface 18 of the conduit 12 (FIG. 1). In one embodiment, the engagement portion 32 is disposed proximate a centrally disposed location along the conduit 12, but it is to be appreciated that the mating component 14 may engage the conduit 12 in alternative locations.

As described above, upon release of the conduit 12 from the elastically deformed condition, a fully engaged position between the conduit 12 and the mating component 14 results. In the fully engaged position, contact interference between the outer surface 18 of the conduit 12 and the inner surface 20 of the mating component 14 advantageously achieves a tight, fitted engagement between the components. Since the inner surface 20 of the mating component 14 is dimensioned to prevent full expansion of the conduit 12 to the relaxed condition, the conduit 12 remains partially elastically deformed in the fully engaged position.

Figure 5:
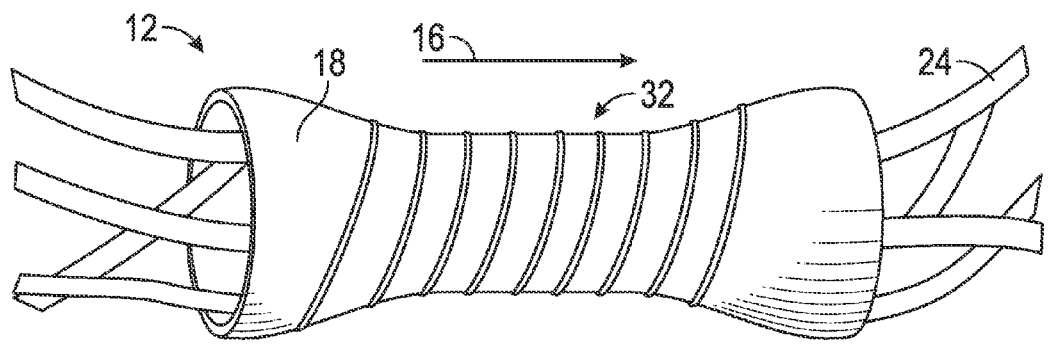
FIG. 5 is a side, elevational view of a conduit of the elastically deformable conduit assembly in an elastically deformed condition according to a second embodiment.
Figure 6:
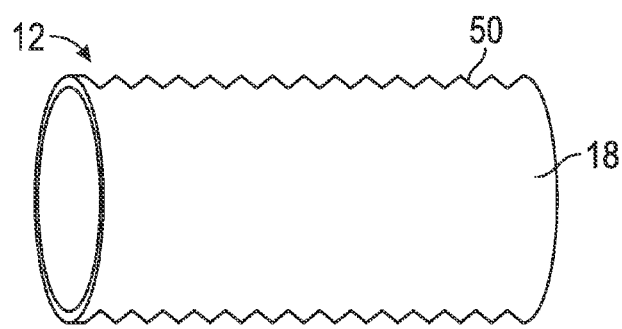
FIG. 6 is a side, elevational view of a conduit of the elastically deformable conduit assembly in a relaxed condition according to a third embodiment.

Referring to FIGS. 5 and 6, alternative embodiments of the conduit 12 are illustrated. The embodiments are similar in many respects to the first embodiment described in detail above, such that duplicative description of several features of the elastically deformable conduit assembly 10 is not necessary. Additionally, similar reference numerals are employed, where applicable.

In a second embodiment (FIG. 5), the conduit 12 is twisted into the elastically deformable condition. It is to be appreciated that the conduit 12 may be subjected to deformation as a result of twisting as an alternative to stretching or in combination with such stretching. Regardless, in the illustrated embodiment, the conduit 12 is twisted to manipulate at least a portion of the conduit 12 to deform to a narrower perimeter or width than when in the relaxed condition. Specifically, the engagement portion 32 of the outer surface 18 is narrowed to facilitate insertion and engagement with the mating component 14, as described above in conjunction with the first embodiment.

In a third embodiment (FIG. 6), the conduit 12 comprises a plurality of ridges 50 along the outer surface 18. Such an embodiment may be referred to as having an accordion-style surface. Similar to the embodiments described above, the conduit 12 is manipulated into the elastically deformable condition by elongating the conduit 12. The plurality of ridges 50 is stretched to form a relatively smooth outer surface upon elongation of the conduit 12. As with the previous embodiments, the outer surface 18 is narrowed to facilitate insertion and engagement with the mating component 14.

Any suitable elastically deformable material may be used for the conduit 12. This includes various metals, polymers, ceramics, inorganic materials or glasses, or composites of any of the aforementioned materials, or any other combinations thereof. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS), such as an ABS acrylic. The material may be in any form and formed or manufactured by any suitable process, including stamped or formed metal, composite or other sheets, forgings, extruded parts, pressed parts, castings, or molded parts and the like, to include the deformable features described herein. The material, or materials, may be selected to provide a predetermined elastic response characteristic of the conduit 12. The predetermined elastic response characteristic may include, for example, a predetermined elastic modulus.

Each of the embodiments described above include elastic deformation of the conduit 12 while engaged with the mating component 14 in the fully engaged position. The elastic deformation of the conduit 12 occurs predominantly proximate the engagement portion 32 of the conduit 12. This elastic deformation may be elastically averaged to account for any positional errors of the conduit 12 and the mating component 14. In other words, gaps and/or misalignment that would otherwise be present due to positional errors associated with portions or segments of the conduit 12 and the mating component 14, particularly locating and retaining features, are eliminated by averaging the deformation of the engagement portion 32 in an over-constrained condition. Specifically, the positional variance of regions of the engagement portion 32 is offset by the remainder of the engagement portion 32 that is being compressed by the mating component 14. In other words, the deformation along the outer surface 18 of the entire engagement portion 18 is averaged in aggregate along the outer surface 18. The principles of elastic averaging are described in detail in commonly owned, co-pending U.S. patent application Ser. No. 13/187,675, the disclosure of which is incorporated by reference herein in its entirety.

Figure 7:
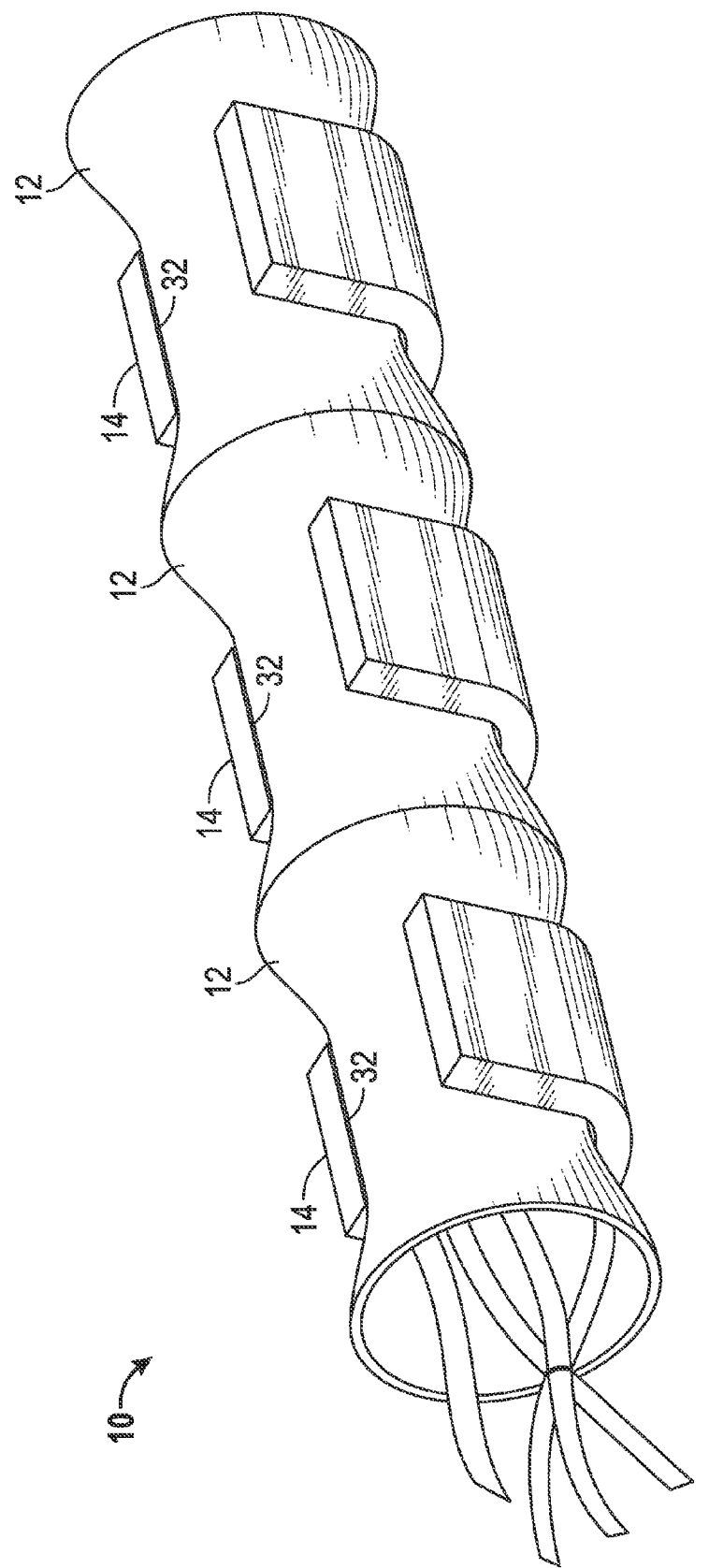
FIG. 7 is a perspective view of the elastically deformable conduit according to another aspect of the invention.

Referring to FIG. 7, in one embodiment the elastically deformable conduit assembly 10 includes a plurality of mating components 14 configured to fittingly engage the conduit 12 at various regions of the outer surface 18 of the conduit, such as a plurality of engagement portions 32, for example. In such an embodiment, the elastic deformation of the plurality of engagement portions is averaged in aggregate relative to each other, in accordance with the principles referenced above.

Figure 8:
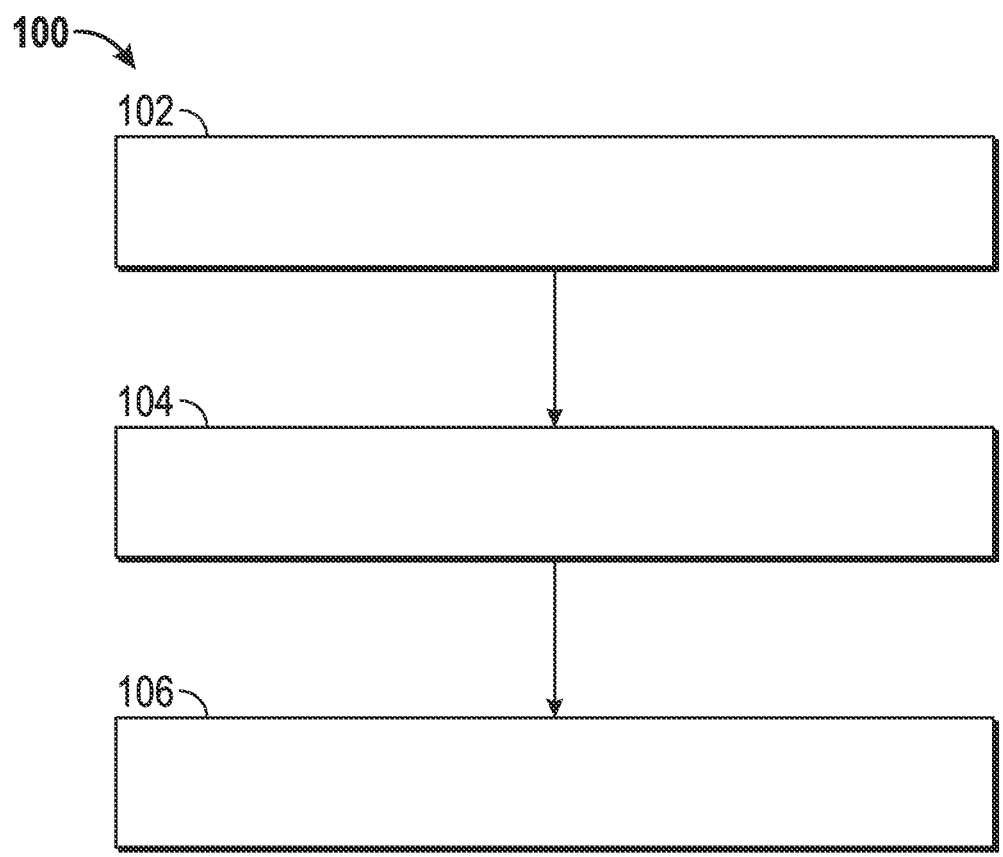
FIG. 8 is a flow diagram illustrating a method of fittingly retaining wires with the elastically deformable conduit assembly.

A method of fittingly retaining wires 100 is also provided, as illustrated in FIG. 8, and with reference to FIGS. 1-7. The elastically deformable conduit assembly 10, and more specifically the elastically deformable nature of the conduit 12, has been previously described and specific structural components need not be described in further detail. The method 100 includes extending 102 the plurality of wires 24 through the conduit 12. The method 100 also includes elastically deforming 104 the conduit 12 to an elastically deformed condition comprising a narrowing of at least a portion of the conduit 12. The method 100 further includes engaging 106 the mating component 14 with the portion of the conduit 12 that is narrowed in response to the elastic deformation of the conduit 12.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of fittingly retaining wires comprising:
   extending a plurality of wires through a conduit disposed in a vehicle, wherein the conduit comprises an outer surface and is formed of an elastically deformable material;
   elastically deforming the conduit from a relaxed condition to an elastically deformed condition, the elastically deformed condition comprising a narrowing of at least a portion of the conduit, at least a portion of the outer surface having a first width in the relaxed condition and a second width in the elastically deformed condition, the first width greater than the second width;
   engaging an inner surface of a mating component disposed in a vehicle with the portion of the conduit that is narrowed in response to the elastic deformation of the conduit, the inner surface defining an inner width, the first width of the conduit greater than the inner width, wherein the conduit and the mating component are disposed in a fully engaged position that comprises contact interference between the outer surface of the conduit and the inner surface of the mating component, wherein the conduit is elastically compressed in the fully engaged position;
   exerting a longitudinal force on a hook extending from the outer surface of the conduit for facilitating elastically deforming the conduit; and
   releasing the longitudinal force on the hook to provide a fully engaged relationship between the mating component and the conduit.

2. The method of claim 1, wherein elastically deforming the conduit comprises stretching the conduit to the elastically deformed condition.

3. The method of claim 1, further comprising engaging a plurality of mating components with a plurality of portions of the outer surface of the conduit.

4. The method of claim 3, further comprising performing an elastic averaging of the amount of deformation of the plurality of portions of the conduit upon reaching a fully engaged position of the conduit and the plurality of mating components.

* * * * *